United States Patent Office
2,992,894
Patented July 18, 1961

2,992,894
PROCESS FOR CONCENTRATING COPPER AND ZINC VALUES PRESENT IN AQUEOUS SOLUTION
Wayne C. Hazen and Angus V. Henrickson, Boulder, Colo., assignors to Kerr-McGee Oil Industries, Inc., a corporation of Delaware
No Drawing. Filed Oct. 1, 1957, Ser. No. 687,356
13 Claims. (Cl. 23—147)

The present invention relates to a process for preparing concentrates of copper and zinc from their ores and other source materials. More particularly, the present invention relates to an improved process for recovering copper and zinc from their aqueous solutions such as leach liquors and mine waters as a concentrate which may be further processed to obtain the free metal.

The recovery of copper and zinc from their aqueous solutions by processes known in the art is an involved and costly procedure. In addition, the concentrates of copper and zinc thus prepared often contain undesirable impurities which may interfere with the further processing of the concentrates to the metal. While copper and zinc may be economically concentrated and thus recovered from relatively concentrated aqueous solutions, the recovery of copper and zinc from their dilute aqueous solutions is generally considered to be uneconomic even though it may be accomplished in some instances. Heretofore, few processes have existed, such as the cementation process for the recovery of copper, whereby a concentrate of copper and zinc may be economically recovered from very dilute solutions. For example, a process is not presently available for readily and economically recovering zinc from dilute solutions thereof.

When it is considered that dilute solutions of copper and zinc occur naturally and in large volume, such as in mine waters, it will be apparent that methods are needed for economically recovering these metals from their dilute solutions. The cementation process for the recovery of copper has a number of disadvantages in actual operation and also is frequently uneconomic due, in part, to wide fluctuations in the price of the reductor metal, such as scrap iron, aluminum, etc. Thus, a great need has long existed in the art for a suitable economic process for the recovery of copper and zinc from both their very dilute and relatively concentrated aqueous solutions, whether such solutions occur naturally, such as in mine waters, or whether the solutions are prepared from the ores of copper and zinc, such as leach liquors.

It has been discovered that copper and zinc may be readily concentrated and thus recovered from aqueous solutions containing divalent cations of copper and zinc by a process comprising contacting such aqueous solutions with a substantially water-immiscible selective solvent comprising an organic hydrogen phosphate having at least one and not more than two hydrogens of the phosphoric acid replaced with an alkyl radical to thereby produce a metal cation-loaded selective solvent which is then separated from the extracted aqueous solution. The process to be described more fully hereinafter provides for the economic recovery of the divalent cations of copper and zinc from their aqueous solutions, e.g., leach liquors obtained from their ores, naturally occurring mine waters, etc., as a concentrate which may be further processed to produce the respective metals.

It is an object of the present invention to provide a novel process for economically concentrating and recovering the divalent cations of copper and zinc from their aqueous solutions.

It is a further object of the present invention to provide an improved process for selectively extracting the divalent cations of copper and zinc from their aqueous solutions by means of a substantially water-immiscible selective solvent comprising an organic hydrogen phosphate having at least one and not more than two hydrogens of phosphoric acid replaced with an alkyl radical.

It is still a further object of the present invention to provide an improved process for concentrating and recovering the divalent cations of copper and zinc contained in an aqueous solution by reactive extraction of the same with a water-immiscible selective solvent comprising an organic hydrogen phosphate and to prepare a metal concentrate therefrom.

It is still a further object of the present invention to provide a process for recovering the divalent cations of copper and zinc from a metal cation-loaded water-immiscible selective solvent comprising organic hydrogen phosphate to thereby produce a concentrate of the metal cations and a regenerated water-immiscible selective solvent.

Still other objects of the present invention and the advantages thereof will be apparent to those skilled in the art by reference to the following detailed description and the examples.

In accordance with the present invention, it has been discovered that the divalent cations of copper and zinc may be readily concentrated and thus recovered from aqueous solutions thereof by extraction with a suitable water-immiscible selective solvent comprising organic hydrogen phosphate, provided the pH of the aqueous solution is such that the distribution coefficient for the metal to be extracted is at least one and not in excess of that pH value at which a precipitate of the metallic hydroxides or basic salts is formed. The resulting metal cation-loaded water-immiscible selective solvent is then separated from the extracted aqueous solution and stripped with either an acidic or alkaline regenerant to thereby produce a concentrate of the extracted cations in the stripping solution, and a regenerated water-immiscible selective solvent which may be recycled in the process of the present invention. The concentrate of extracted metal cations thus prepared may be processed in accordance with processes well known in the art to thereby produce the free metal.

The pH of the aqueous solution during the extraction step is critical. In general, the divalent cations of copper and zinc may be extracted from their aqueous solutions at any pH at which their respective distribution coefficients are at least one, and up to that pH value at which at least one of the metals is precipitated from the aqueous solution in the basic form, e.g., as the metallic hydroxide and/or basic salt. However, the preferred pH range for extracting divalent cations of copper from aqueous solutions thereof is from 2.5 to 3.5, while the preferred pH range for extracting divalent cations of zinc from their aqueous solutions is from 1.5 to 4.0, provided the above mentioned conditions are met, i.e., the distribution coefficient for the metal to be extracted being at least one and a basic precipitate not being formed.

The distribution coefficient for the metal to be extracted is influenced to some extent by both the nature of the organic hydrogen phosphate comprising the selective solvent and the nature of the organic carrier, when present, for the organic hydrogen phosphate. For example, when the water-immiscible selective solvent comprises a solution of di-2-ethyl hexyl hydrogen phosphate in kerosene, the pH at which the distribution coefficient for divalent copper and zinc has a value of one is at pH values of 2.80 and 1.56, respectively. Therefore, when the water-immiscible selective solvent comprises a solution of di-2-ethyl hexyl hydrogen phosphate in an inert organic carrier, the preferred pH ranges for the aqueous solution to be extracted are from 2.80 to 3.5 for divalent copper and from 1.56 to 4 for zinc. While the preferred pH ranges for extraction of the aqueous solution may vary slightly from the above mentioned preferred ranges for various different organic hydrogen phosphates which may comprise the water-immiscible selective solvent, it will be apparent that in every instance the lower pH value will be that pH at which the distribution coefficient for the particular divalent cation to be extracted is one, and the upper pH limit in each instance will be that pH value at which at least one of the metals is precipitated in the basic form, i.e., the metallic hydroxide and/or basic salt.

A wide variety of organic hydrogen phosphates having at least one and not more than two hydrogens of the phosphoric acid replaced with an alkyl radical are suitable for use in practicing the present invention. In general, any suitable mono- and di-alkyl hydrogen phosphate may be used as a selective solvent in accordance with the present invention but, in some instances, selective solvent loss and emulsion problems are prohibitive from an economic standpoint and the use of certain organic hydrogen phosphates for practicing the present invention are to be avoided for these reasons. For example, selective solvent loss due to water solubility becomes appreciable in instances where the alkyl radical contains less than about 6 carbon atoms, and particularly is this so with mono-alkyl derivatives. Also, in instances where the alkyl groups contain more than about 16 carbon atoms, the organic hydrogen phosphates are very viscous liquids or solids which give viscous solutions, and emulsion problems are enhanced. Therefore, the preferred mono- and di-alkyl hydrogen phosphates for use in accordance with the present invention are those wherein the alkyl groups contain from 8 to 14 carbon atoms. The mono- and di-alkyl hydrogen phosphates having alkyl groups containing from 10 to 14 carbon atoms appear to be more selective in their action for the divalent cations of copper and zinc in some instances and give even better results. The highly branched-chain alkyl groups appear to be less prone to form emulsions and are preferred for this reason. For example, mono- and di-2-ethyl hexyl hydrogen phosphate have been found to be excellent selective solvents due to their selective action for the divalent cations of copper and zinc, and their ability to be used in practicing the present invention without the formation of emulsions.

The problem of emulsion formation may also be reduced by raising the temperature of the aqueous solution to be extracted to 90–120° F. and/or by reducing the ferric iron content to ferrous iron. Thus, preferably the aqueous solution to be extracted is first heated to a temperature within the foregoing range and the ferric iron content reduced to ferrous iron. When operating in accordance with this preferred procedure, and when using a mono- or di-alkyl hydrogen phosphate wherein the alkyl group is highly branched and contains from 8 to 14 carbon atoms, the emulsion difficulties are overcome. The preferred selective solvent is di-2-ethyl hexyl hydrogen phosphate.

In practicing the present invention, it is preferred to first prepare a solution of a suitable water-immiscible organic hydrogen phosphate in a water-immiscible inert carrier. The term "water-immiscible inert carrier," as used in the specification, is understood to mean a suitable organic carrier having appreciable solubility for the specific organic hydrogen phosphate selected for use in accordance with the present invention, and which is substantially immiscible or insoluble in water, and unreactive under the conditions taught in this invention. Examples of such inert water-immiscible carriers are hydrocarbons such as benzene, toluene, cyclohexane, hexane, or octane, paraffinic or aromatic petroleum distillates such as light or heavy naphthas, kerosene, etc., chlorinated solvents such as carbon tetrachloride, perchloroethylene, etc., or the lower water-immiscible ketones, esters, etc. The inert water-immiscible light petroleum distillates such as kerosene or naphtha are preferred for economic reasons. The use of one or more of the foregoing water-immiscible inert carriers serves to reduce the viscosity of the water-immiscible organic hydrogen phosphate and, in addition, presents a medium in which the acid and salt forms of the water-immiscible organic phosphate may be distributed between the organic phase and the aqueous phase in the extraction process of the present invention.

The concentration of organic hydrogen phosphate in the above mentioned carriers may vary over a considerable range. For example, the water-immiscible selective solvent may comprise a solution containing 1 to 30% by volume of suitable organic hydrogen phosphate with the remainder being one or more of the above mentioned inert carriers. However, in many instances, the extraction solution may contain organic hydrogen phosphate in higher percentages by volume than 30%.

In the extraction step, preferably a water-immiscible selective solvent containing from 1 to 30% by volume of water-immiscible organic hydrogen phosphate in a suitable water-immiscible inert carrier is brought into intimate contact with an acidic aqueous solution containing at least one cation selected from the class consisting of the divalent cations of copper and zinc. The acidic aqueous solution and water-immiscible selective solvent may be contacted by any suitable well-known means such as in a counter-current extraction unit and for such period of time as is necessary to effect extraction of the desired cations. The acidic aqueous solution is maintained at a pH value wherein the distribution coefficient for the metal to be extracted is at least one and less than that pH value at which a basic precipitate is formed. In addition, the temperature of the acidic aqueous solution may be maintained within the temperature range of 90–120° F. and the ferric iron content reduced to ferrous iron. When practicing the extraction step under such conditions, the emulsion problems are almost entirely eliminated with the preferred organic hydrogen phosphates.

After the water-immiscible selective solvent and acidic aqueous solution have been contacted, the metal cation-loaded selective solvent is separated from the extracted aqueous solution. The metal cation content is then recovered by stripping with a suitable stripping agent, which may be either an acidic or alkaline regenerant for the particular organic hydrogen phosphate that is selected. The term "acidic regenerant" as used in the specification and claims is intended to mean acidic stripping agents such as an aqueous 5 to 10% sulfuric acid solution, or other suitable aqueous mineral acid solutions. The term "alkaline regenerant" as used herein in the specification and claims is intended to mean alkaline stripping agents such as a 10% ammonium carbonate solution or 10% sodium carbonate solution, or other alkali carbonate solutions. Generally stated, in instances where an acidic regenerant is used, the pH of the acidic regenerant should be such that the distribution coefficient for the metal to be extracted is less than one, and in instances where an alkaline regenerant is used, the pH of the alkaline regenerant should be such as to precipitate the extracted metal cations as their hydroxides or basic salts. It will be apparent from the foregoing that the stripping step, whether the regenerant is of the acidic or alkaline type, provides a process for obtaining a concentrate of the extracted metal cations in the stripping solution, and also provides a regenerated selective solvent which may be recycled in the process. The metal concentrate in the stripping solution may be further processed in accordance with processes well known in the art, such as electrolysis or other suitable processes, to thereby obtain the free metal.

The foregoing detailed description of the novel process of the present invention and the following specific examples are for purposes of illustration only, and are not

Example I

A finely divided copper containing ore was leached with dilute sulfuric acid. The resulting acidic leach liquor upon analysis was found to contain four grams of copper per liter.

The pH of a portion of the acidic leach liquor as above prepared was raised from a pH of 2.2 to a pH of 3.5 with a lime slurry. Then 100 parts by volume of the resulting acidic leach liquor having a pH of 3.5 was intimately contacted for a period of one minute with 100 parts by volume of a kerosene solution containing 5% by volume of di-2-ethyl hexyl hydrogen phosphate. The kerosene layer was recovered by decantation, and the extracted acidic leach liquor discarded. Analysis of the raffinate indicated that over 95% of the original copper content of the leach liquor was extracted in the foregoing extraction step. The separated kerosene extract was stripped with 20 parts by volume of 5% sulfuric acid, and the resulting acidic strip solution separated from the regenerated kerosene solution. The regenerated kerosene solution was then contacted with the raffinate to achieve substantially complete removal of the remaining copper content.

The separated acidic strip solution containing a concentrate of copper was found to be of sufficient purity for further processing in accordance with a suitable prior art process to thereby obtain copper in the metallic state.

Example II

A second portion of the acidic leach liquor prepared in Example I was adjusted to a pH of 2.5 with lime slurry. Then, equal parts by volume of the resulting leach liquor and a 0.8 M solution of dodecyl hydrogen phosphate in kerosene was intimately contacted for a period of about one minute. The kerosene solution was separated from the extracted leach liquor and stripped with a quantity of 10% sulfuric acid solution equivalent to 5% by volume of the extracted leach liquor.

Analysis of the sulfuric acid strip solution indicated that about 95% of the original copper content in the leach liquor had been extracted. The regenerated kerosene solution was then used in carrying out a series of similar extraction cycles and was found to give excellent results with essentially no loss in activity of the solvent even after numerous cycles.

Example III

The extraction of Example I was repeated with the exception that an alkaline type regenerating agent was used instead of the acidic type employed in Example I.

A kerosene extract as prepared in Example I was stripped with 10% sodium carbonate solution. A solid gelatinous precipitate of copper hydroxide was formed during the stripping process. The kerosene solution was found to be regenerated but complete separation of the phases presented a problem due to the nature of the precipitate.

A second kerosene extract prepared as in Example I was stripped with 10% ammonium carbonate solution instead of the sodium carbonate used above. The ammonium carbonate solution was found to give a liquid aqueous phase which was free of a copper precipitate due to the formation of the more soluble ammonium copper complex. It was much easier to separate the phases in the absence of the above precipitate and for this reason ammonium carbonate solution is preferred over sodium carbonate solution as an alkaline stripping agent.

It was noted that an alkaline regenerant was more effective in removing tetravalent elements such as titanium which tend to accumulate and poison the selective solvent. Therefore, an alkaline regenerant is preferred where there is considerable poisoning due to tetravalent elements such as titanium.

Example IV

A finely divided zinc containing ore was leached with sulfuric acid. The resulting acidic leach liquor contained about 4 to 6 grams per liter of zinc and had a pH of 2.

A portion of the zinc containing solution above prepared was intimately contacted with a light petroleum distillate containing 10% by volume of di-2-ethyl hexyl hydrogen phosphate for a short period of time, e.g., about 1 to 3 minutes. The organic phase was then separated and stripped with one volume of 10% sulfuric acid to ten volumes of organic phase. Analysis of the strip solution indicated about 80% recovery of zinc by the foregoing extraction step. However, when the above extraction step was carried out under countercurrent conditions, the zinc recovery was more complete. The acidic strip solution was neutralized with alkali and the resulting zinc hydroxide precipitate removed by filtration. The filter cake thus prepared was found to be of a grade suitable for charging to a conventional zinc pyrometallurgical process to thereby obtain zinc in the metallic state.

The regenerated selective solvent from the above stripping step was recycled in the process and was found to give excellent results.

Example V

A mine water containing 0.5 gram per liter of zinc and having a pH of 2.5 was intimately contacted with a kerosene solution of a mixture of mono-alkyl di-hydrogen phosphates, the alkyl group having from 10 to 14 carbon atoms. The extract phase was separated and then stripped with strong mineral acid, e.g., about 10% sulfuric acid.

The zinc content of the resulting acidic strip solution was recovered by precipitation with alkali and an analysis of the resulting precipitate indicated a 95% recovery of the zinc originally present in the mine water.

What is claimed is:

1. A process for concentrating by solvent extraction divalent cations of copper and zinc present in an aqueous acidic solution comprising contacting an aqueous solution containing at least one divalent metal cation selected from the class consisting of the divalent cations of copper and zinc with a substantially water-immiscible organic selective solvent comprising an organic hydrogen phosphate having at least one and not more than two hydrogens of the phosphoric acid replaced with an alkyl radical containing about 6-16, inclusive, carbon atoms, the pH of the aqueous solution being such that the distribution coefficient for the cation to be extracted is at least one and less than that pH value at which a precipitate of the metallic hydroxide is formed, and separating the resulting metal cation-loaded selective solvent from the extracted aqueous solution.

2. The process of claim 1 wherein the aqueous solution contains divalent cations of copper and the pH of the aqueous solution is between 2.5 and 3.5.

3. The process of claim 1 wherein the aqueous solution contains divalent cations of zinc and the pH of the aqueous solution is between 1.5 and 4.0.

4. A process for concentrating by solvent extraction divalent cations of copper and zinc present in an aqueous acidic solution comprising contacting an aqueous solution containing at least one divalent metal cation selected from the class consisting of the divalent cations of copper and zinc with a substantially water-immiscible organic selective solvent comprising an organic hydrogen phosphate having at least one and not more than two hydrogens of the phosphoric acid replaced with an alkyl radical containing from 8 to 14 carbon atoms, the pH of the aqueous solution being such that the distribution coefficient for the metal cation to be extracted is at least one and less than that pH value at which a precipitate of the metallic hydroxide is formed, and separating the resulting metal cation-loaded selective solvent from the extracted aqueous solution.

5. The process of claim 4 wherein the aqueous solution contains divalent cations of copper and the pH of the aqueous solution is between 2.5 and 3.5.

6. The process of claim 4 wherein the aqueous solution contains divalent cations of zinc and the pH of the aqueous solution is between 1.5 and 4.0.

7. A process for concentrating by solvent extraction divalent cations of copper and zinc present in an aqueous acidic solution comprising contacting an aqueous solution containing at least one divalent metal cation selected from the class consisting of the divalent cations of copper and zinc with a substantially water-immiscible organic selective solvent comprising di-2-ethyl hexyl hydrogen phosphate, the pH of the aqueous solution being such that the distribution coefficient for the metal cation to be extracted is at least one and less than that pH value at which a precipitate of the metallic hydroxide is formed, and separating the resulting metal cation-loaded selective solvent from the extracted aqueous solution.

8. The process of claim 7 wherein the separated metal cation-loaded selective solvent is stripped with an aqueous solution of acidic regenerant having a pH at which the distribution coefficient for the metal cation to be extracted is less than one to yield a concentrate of the extracted cations and a regenerated selective solvent.

9. The process of claim 7 wherein the separated metal cation-loaded selective solvent is stripped with an aqueous solution of alkaline regenerant having a pH at which the metal cations are precipitated as a compund of the metal to yield a concentrate of the extracted cations and a regenerated selective solvent.

10. The process of claim 7 wherein the aqueous solution contains divalent cations of copper and the pH of the aqueous solution is between 2.80 and 3.5.

11. The process of claim 10 wherein the temperature of the aqueous solution is from 90° F. to 120° F.

12. The process of claim 7 wherein the aqueous solution contains divalent cations of zinc and the pH of the aqueous solution is between 1.56 and 4.0.

13. The process of claim 12 wherein the temperature of the aqueous solution is from 90° F. to 120° F.

References Cited in the file of this patent

UNITED STATES PATENTS

| | | |
|---|---|---|
| 2,227,833 | Hixon et al. | Jan. 7, 1941 |
| 2,743,170 | Burger | Apr. 24, 1956 |
| 2,809,091 | Jonke | Oct. 8, 1957 |
| 2,812,233 | Lewis et al. | Nov. 5, 1957 |
| 2,859,092 | Bailes et al. | Nov. 4, 1958 |
| 2,860,031 | Grinstead | Nov. 11, 1958 |
| 2,902,454 | Moore | Sept. 1, 1959 |

UNITED STATES PATENT OFFICE
CERTIFICATE OF CORRECTION

Patent No. 2,992,894                                            July 18, 1961

Wayne C. Hazen et al.

It is hereby certified that error appears in the above numbered patent requiring correction and that the said Letters Patent should read as corrected below.

Column 5, line 36, for "was" read -- were --; column 6, line 49, after "the" insert -- metal --.

Signed and sealed this 2nd day of January 1962.

(SEAL)
Attest:

ERNEST W. SWIDER                                         DAVID L. LADD
Attesting Officer                                             Commissioner of Patents
                                                                                         USCOMM-DC